S. F. GIERYMSKI AND P. PIETRZYCKI.
DRILL CUTTING MACHINE.
APPLICATION FILED AUG. 16, 1919.
1,360,389.
Patented Nov. 30, 1920.
5 SHEETS—SHEET 1.
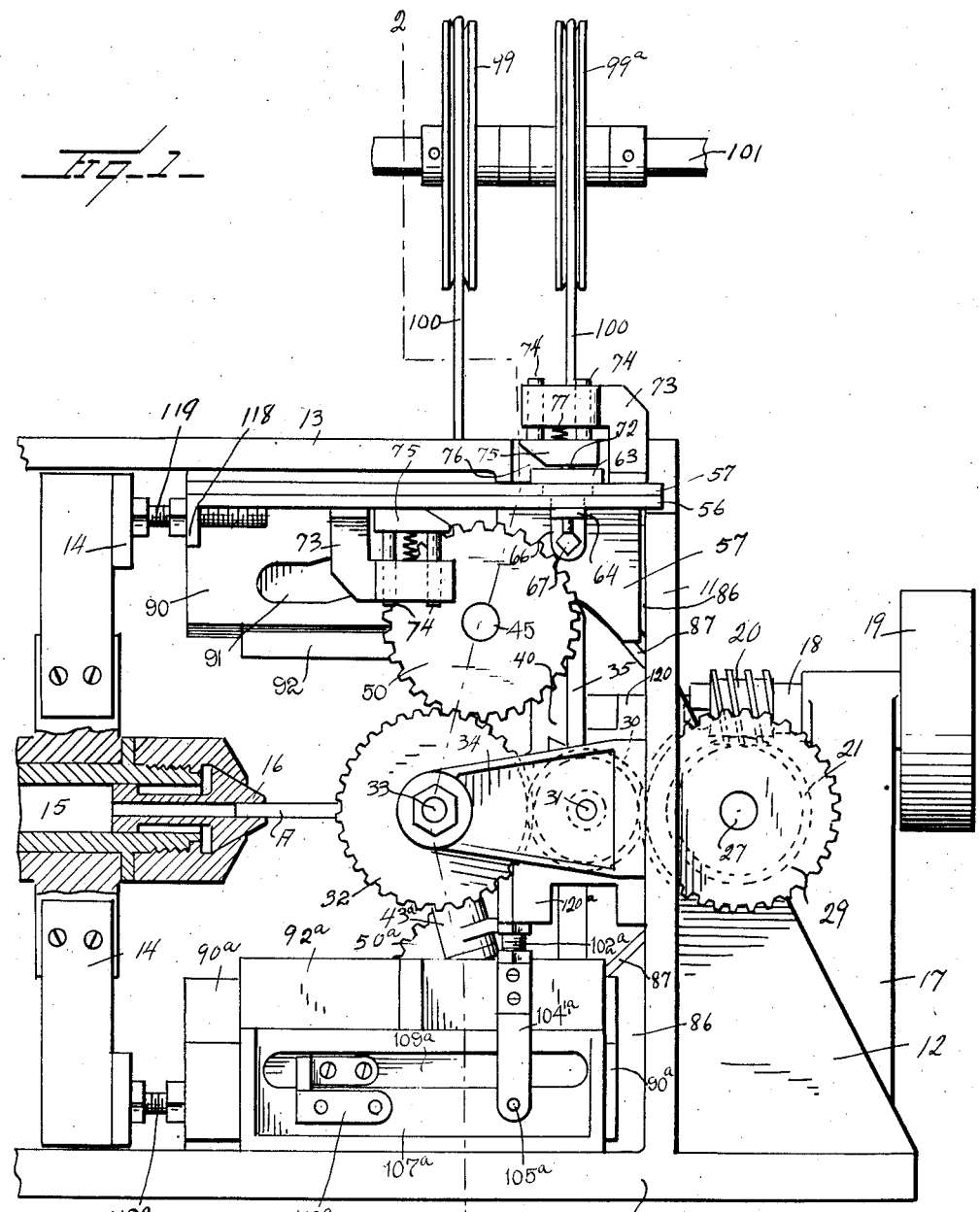
Inventors
S. F. Gierymski and
P. Pietrzycki.
By Watson E. Coleman
Attorney

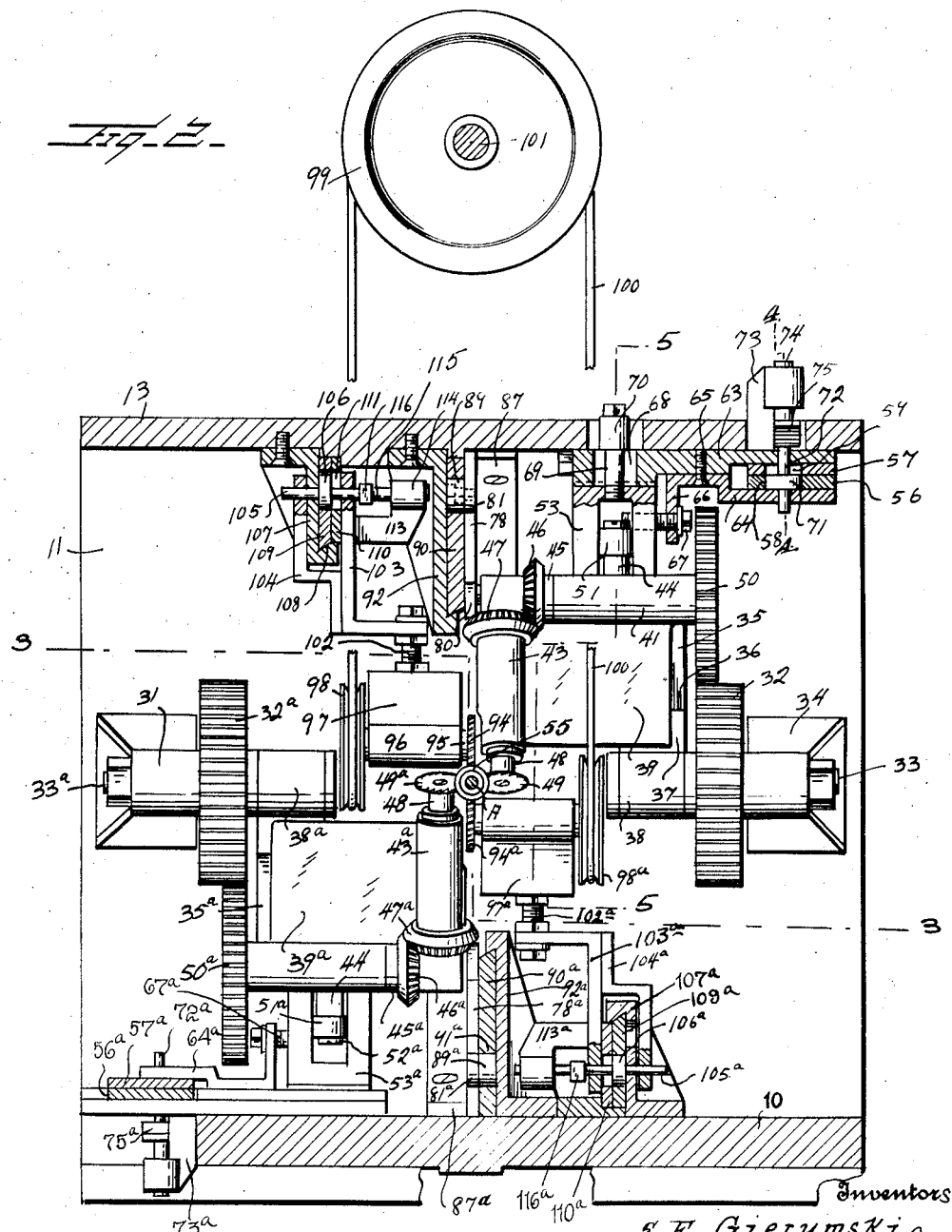

S. F. GIERYMSKI AND P. PIETRZYCKI.
DRILL CUTTING MACHINE.
APPLICATION FILED AUG. 16, 1919.
1,360,389.
Patented Nov. 30, 1920.
5 SHEETS—SHEET 3.
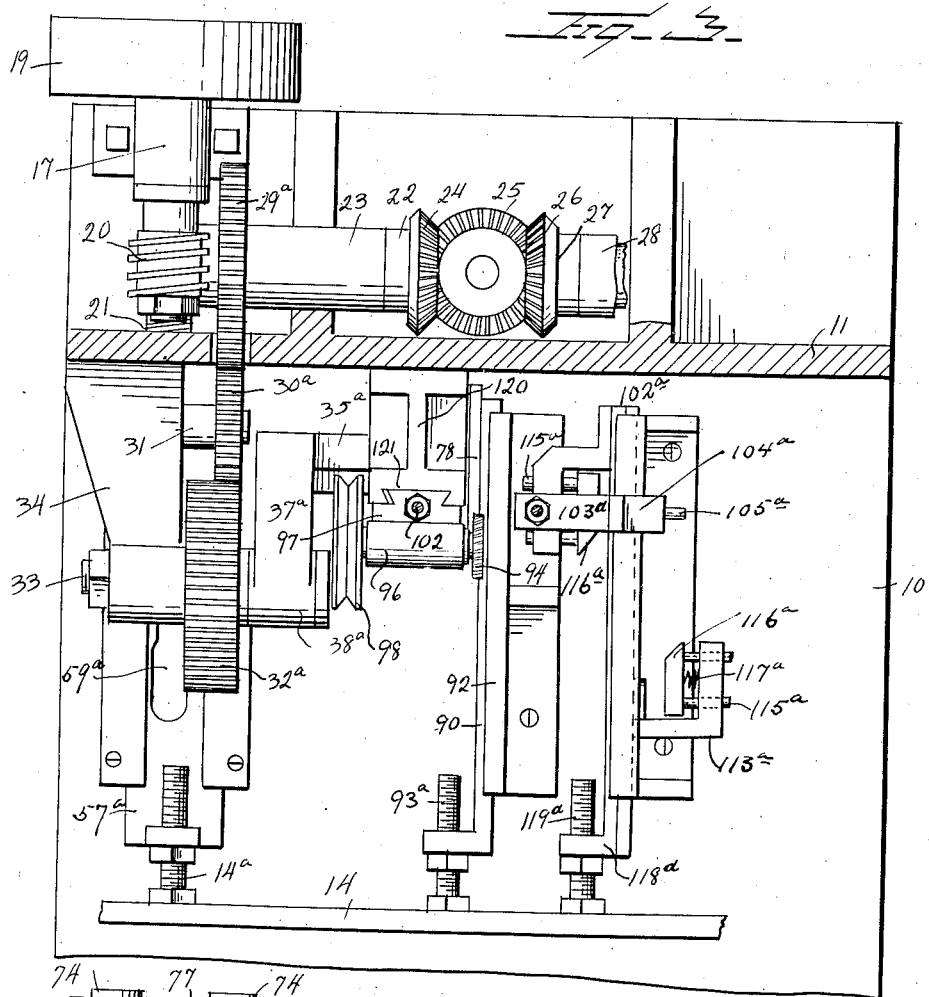
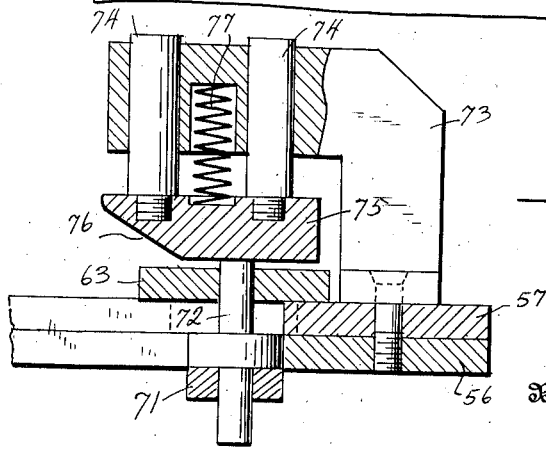
Inventors
S. F. Gierymski and
P. Pietrzycki
By Watson E. Coleman
Attorney S. F. GIERYMSKI AND P. PIETRZYCKI.
DRILL CUTTING MACHINE.
APPLICATION FILED AUG. 16, 1919.
1,360,389.
Patented Nov. 30, 1920.
5 SHEETS—SHEET 4.
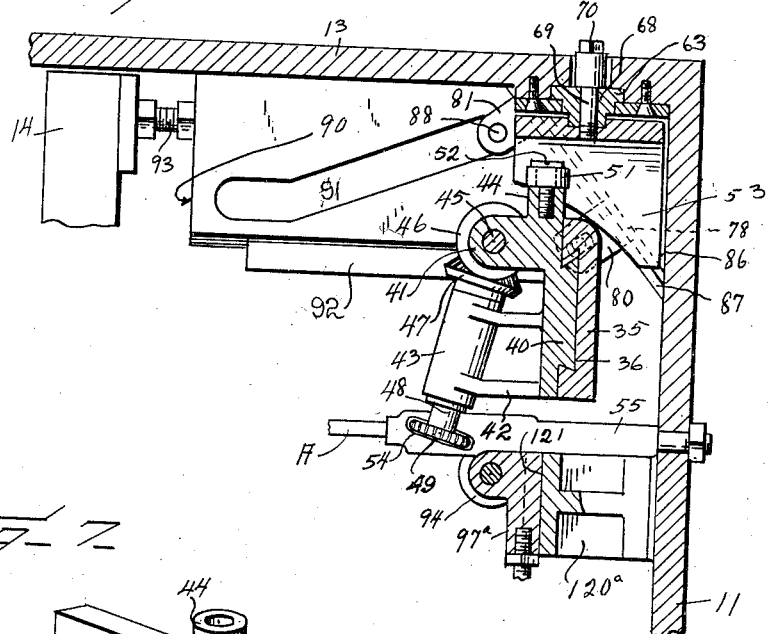
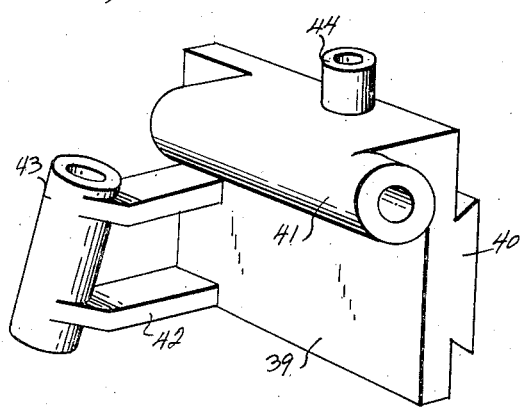
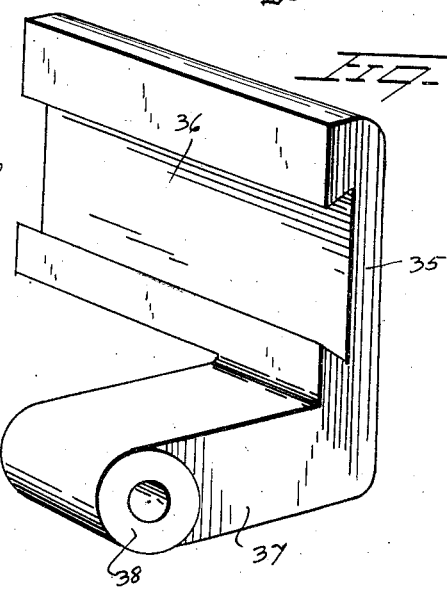
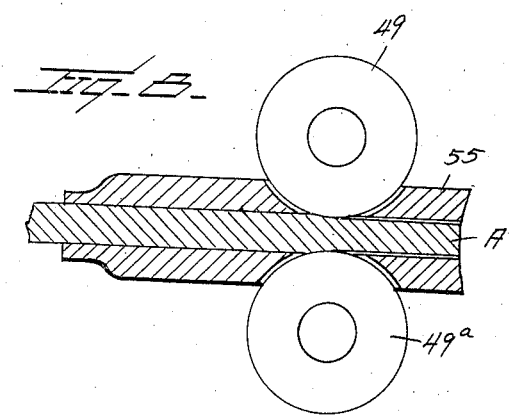

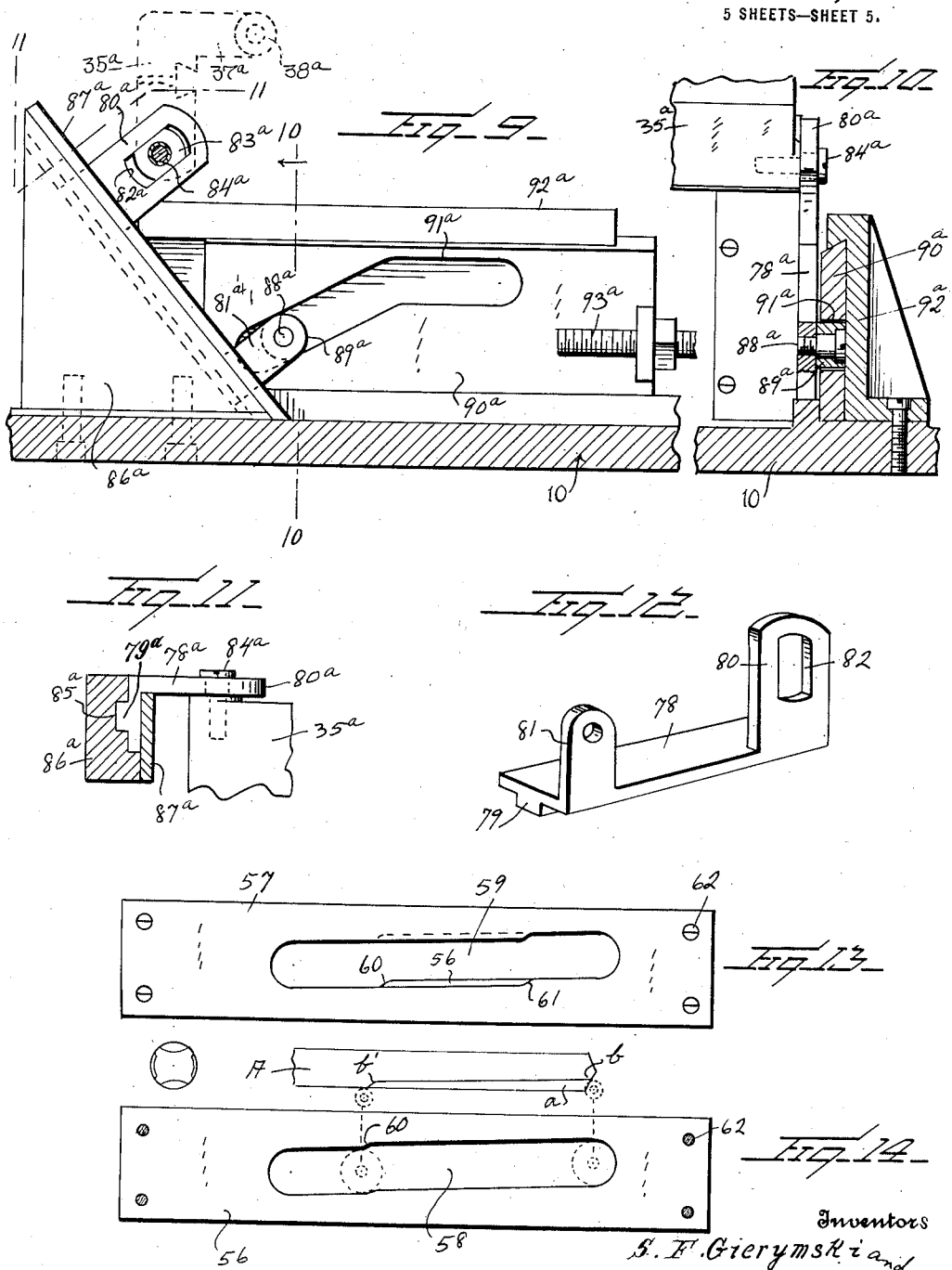

UNITED STATES PATENT OFFICE.

STANLEY F. GIERYMSKI, OF KENSINGTON, AND PETER PIETRZYCKI, OF HARTFORD, CONNECTICUT.

DRILL-CUTTING MACHINE.

1,360,389. Specification of Letters Patent. Patented Nov. 30, 1920.

Application filed August 16, 1919. Serial No. 317,956.

*To all whom it may concern:*

Be it known that we, STANLEY F. GIERYMSKI and PETER PIETRZYCKI, citizens of the United States, residing at Kensington and Hartford, respectively, in the county of Hartford and State of Connecticut, have invented certain new and useful Improvements in Drill-Cutting Machines, of which the following is a specification, refernece being had to the accompanying drawings.

This invention relates to machines for cutting twist drills, and particularly to machines of that character wherein the drill is mounted in a rotating chuck fed forward while the flutes and the clearance of the drill are being cut by suitable cutters.

In machines of this character, it is usual to provide one clearance cutter and one flue cutter, and as there are two flutes it is necessary that two operations be performed upon the drill in order to cut the two flutes and to form a clearance for the drill.

The general object of this invention is to provide a machine of this character wherein, however, both flutes are cut at the same time and the clearance of the drill is cut simultaneously.

A further object is to provide improved means for securing the outward and inward movement of the cutters relative to the axis of the drill being cut and to thereby provide for a gradual increase in the depth of the flutes toward the cutting extremity of the drill, and provide improved means for securing an even width of cut without regard to the position of the cutters nearer to or farther from the axis of the drill.

Another object is to provide a drill cutting machine which is so constructed that it may cut drills of widely differing sizes and have a relatively large range of adjustment.

Other objects will appear in the course of the following description.

Our invention is illustrated in the accompanying drawings, wherein:—

Figure 1 is a side elevation, partly in section, of our drill cutting machine;

Fig. 2 is a vertical section on the line 2—2 of Fig. 1;

Fig. 3 is a section on the line 3—3 of Fig. 2;

Fig. 4 is a fragmentary detail section on the line 4—4 of Fig. 2;

Fig. 5 is a fragmentary section on the line 5—5 of Fig. 2;

Fig. 6 is a perspective view of the carrier;

Fig. 7 is a perspective view of the cutter carrying slide coacting with the carrier;

Fig. 8 is a fragmentary sectional view of the drill support, a drill, and the flute cutters engaging therewith;

Fig. 9 is an elevation of the slide 90$^a$ and allied parts in Fig. 2;

Fig. 10 is a section on the line 10—10 of Fig. 9;

Fig. 11 is a section on the line 11—11 of Fig. 9;

Fig. 12 is a perspective view of the slide;

Fig. 13 is a face view of a pair of cutter controlling cams;

Fig. 14 is a face view of one of said cams;

Fig. 15 is a face view of the cam controling the cutting of the clearance of the drill.

Referring particularly to Figs. 1 to 5, 10 designates a base having an upwardly extending wall 11 braced from the base by a web 12, this wall assisting to support a horizontally disposed wall 13. The base 10 may be part of a drill cutting machine and mounted upon this base 10 for longitudinal movement is a member 14 which supports a drill spindle 15 having a drill chuck of any suitable construction and designated generally 16 which, in turn, supports a blank A of the drill which is to be cut. The drill spindle and chuck are rotated by any suitable mechanism, which will be well understood to those skilled in the art and which needs no description, and at the same time the drill spindle may be fed forward or retracted by suitable mechanism which it is not necessary to describe, as it is common and well known in the art. We do not wish to be limited to any particular means for mounting the drill spindle or the chuck and rotating the drill spindle and chuck or shifting the drill spindle or chuck toward or from the wall 11, as such mechanism forms no part of our invention and, as before remarked, may be of any suitable or usual construction.

Mounted in a suitable bearing 17 on the base is a drive shaft 18 having thereon a belt wheel 19 whereby power may be transmitted by a belt, for instance, from any suitable source of power. This shaft carries a worm 20. This worm engages with a worm wheel 21, shown in dotted lines in Fig. 1, mounted upon a shaft 22 carried in a suitable bearing 23. This shaft 22 at its end carries a beveled gear wheel 24 meshing with a horizontally disposed beveled gear wheel 25, in turn meshing with a beveled gear wheel 26 carried upon a shaft 27 supported in a bearing 28, this shaft 27, as illustrated in Fig. 1, carrying a gear wheel 29. The shaft 22 carries a gear wheel 29$^a$ which corresponds (see Fig. 1) in every respect to the gear wheel 29. There are two cutters to be operated and one of these cutters, as will be seen, is operatively geared and driven by the gear wheel 29 while the other of the cutters is operatively geared to and driven by the gear wheel 29$^a$.

The gear wheel 29 meshes with an intermediate pinion 30 mounted on a stub shaft 31 (see Fig. 1) and this intermediate pinion in turn meshes with a relatively wide gear wheel 32 (see Figs. 1 and 2) which is mounted on a shaft 33 supported upon a laterally projecting bracket 34 extending from the wall 11. The extremity of this shaft 33 forms a pivotal axis for the swinging carrier illustrated in Fig. 6. The body of this carrier is designated 35 and one face of the carrier is longitudinally grooved, as at 36, this groove having undercut side walls. One end of the carrier 35 is provided with an angularly disposed extension or arm 37 formed at its extremity with a bearing 38 through which the shaft 33 loosely passes. Thus, this carrier 35 is swung upon the shaft 33.

Coacting with this carrier 35 and sliding in the groove 36 thereof is a sliding block 39, the inner face of which is formed with a dove-tailed tongue 40 having sliding engagement in the groove 36 (see Fig. 7). The outer face of this block is formed with an elongated bearing 41 extending longitudinally of the block, with outwardly projecting brackets 42 at one end of the block beneath the bearing 41 with a bearing 43 carried by said brackets 42 and extending upwardly and toward the block, and with a hollow, interiorly screw-threaded stud 44 upon its upper face. The bearing 41, as illustrated in Fig. 2, carries a shaft 45 having thereon a beveled gear wheel 46 engaging with a beveled gear wheel 47 mounted upon a shaft 48 extending through the bearing 43, which shaft carries at one end the flute cutter 49. The other end of the shaft 45, as illustrated in Fig. 2, carries a gear wheel 50 which is relatively narrow and meshes with the gear wheel 32. As the slide 39 is shifted by mechanism which will be now described, the gear wheel 50 is shifted relative to the gear 32 but is always in mesh therewith. Mounted upon the hollow stud 44 is a roller 51 held in place by a screw 52 (see Fig. 5) which engages this hollow stud. This roller is engaged between a depending, U-shaped slide 53 shifted by mechanism which will be later described and which acts to shift the sliding block 39 longitudinally upon the carrier 35. The cutter 49 operates through a slot 54 in a tubular support 55 for the end of the drill blank A. This cutter 49 is disposed at an angle to the blank A, as illustrated in Fig. 5, and as the cutter 49 rotates and the drill blank is rotated and fed forward, it is obvious that the cutter 49 will cut the flute in the drill blank. As will be seen from Fig. 2, the shaft 33 which forms the axis upon which the member 35 turns intersects the center of the cutter 49, and the same is true of the shaft 33$^a$ which intersects the center of the cutter 49$^a$.

Now, as illustrated diagrammatically in Fig. 14, the flute $a$ of the drill blank A is relatively shallow at its inner end and gradually becomes deeper as its extends toward the cutting extremity of the blank, and we provide means coacting with the U-shaped member 53 for shifting this member 53 laterally to thereby shift the slide 39 laterally and thereby carry the cutter 49 toward or from the axis of the drill blank. This means consists of the two pattern cam slides 56 and 57, illustrated in Figs. 13 and 14, these slides being disposed one above the other with their slots 58 and 59 respectively in register. The slot 58 extends at a slight angle to the longitudinal axis of the cam plate 56 and is of uniform width throughout its length, but at a certain point in its length, the side walls of the slot are both deflected, as at 60, this deflection corresponding, as shown in Fig. 14, with the termination $b'$ of the groove $a$. The cam plate 57 is the reverse of the plate 56 and the slot 59 has a uniform width from end to end but is deflected, at 61, this deflection 61 corresponding to the end of the flute $a$. The object of these two cams 56 and 57 is to shift the cutter 49 away from the axis of the drill while the cutter is moving from $b$ to $b'$ of the drill, and the object of the slot 59 is to hold the cutter entirely away from the face of the drill in moving from the point $b'$ to the point $b$ of the drill upon a reverse movement of the drill after the flute has been completed. These cam plates 56 and 57 are engaged with each other by screws 62 or other suitable means so that they will move together and are disposed between the slidably mounted plates 63 and 64 (see Fig. 2) which are attached to each other by screws 65. The plate 64 has an angularly extending lug 66 at one end which is attached by an adjusting screw 67 to the U-shaped member 53. The plate 63 is slotted at 68, as is the wall 13 for the accommodation of a screw-threaded pin 69 which engages the member 53, this pin having an enlarged head 70 which bears against the margin of the slot 68 and detachably holds the member 53 to the plate 63. It will thus be seen that by this construction the U-shaped member 53 will shift with the plates 63 and 64 and that this shifting movement will be communicated through the roller 51 to the slide 39 carrying the cutters, as has been stated. The cam plates 56 and 57 are longitudinally reciprocated by engaging with the sliding support 14 for the drill spindle and communicate motion to the plates 63 and 64 by means of a roller 71 having trunnions 72 which extend into and have bearing in the plates 63 and 64 respectively. These trunnions are of sufficient length to permit the roller 71 to be shifted either into the slot 59 or the slot 58. The roller 71 has a diameter approximately equal to the width of the slots 58 and 59. Upon a forward movement of the chuck carrying member 14, motion will be communicated to the cams 57 and 56 by means of the screw 14ª attached to the member 14 which engages with a lug 56ª extending downward from plate 56, as illustrated in Fig. 1, and this forward movement will cause the cam on the plate 56 to shift the roller 71 laterally, thus shifting the plates 63 and 64 laterally and thus in turn shifting the slide on the cutter 49 laterally in correspondence with the form and inclination of the lot 58. As soon as the roller has moved from one portion of the slot 58 to the other, as illustrated in Fig. 14, it will be shifted upward into the slot 59, which upon a reverse movement or retractive movement of the chuck supporting member 14, will act to shift the roller 71 in the reverse direction, that is toward the right in Fig. 2, thus shifting the cutter quickly away from the drill and holding the cutter away from the drill while the drill is moving backward.

For the purpose of shifting the roller 71 from engagement with one cam slide 56 into engagement with the other cam slide 57 and vice versa, we provide the means illustrated specifically in Fig. 4 and also illustrated in general in Fig. 1. Mounted upon the outer end of the cam plate or slide 57 is an upwardly and inwardly extending bracket 73 which, as illustrated in Fig. 4, is formed with perforations for upwardly extending pins 74 which extend through the perforations in the bracket and which, on their lower ends, carry the shoe 75, one end of which is beveled, as at 76. The under face of this shoe is adapted to engage with the upper end of the upper trunnion 72 of the roller 71 and this shoe is urged downward by a spring 77 disposed between the bracket and the shoe and yieldingly holding the shoe in proper position against the face of the plate 63. Attached to the under face of the cam slide 56 at the opposite end of the slot 58 therein is a like bracket 73 having mounted thereon a shoe 75 such as previously described and having its beveled face 76 facing upward in opposition to the beveled face of the first named shoe. This last named shoe 75 is adapted to engage with the lower end of the lower trunnion 72. Now, as the sliding cam plates 56 and 57 reciprocate, these shoes 75 will alternately engage with the trunnion of the roller 71 to shift the roller from engagement with the slot of the plate 57 into engagement with the slot of the plate 56 or vice versa. The plates 56 and 57, as before stated, travel with the carriage or support 14 of the chuck and these shoes 75 travel with them. Therefore, when the cutting is being started on a blank, the upper shoe 75 will force the roller into engagement with the slot of the lower plate 56 (the position shown in Fig. 1) which will urge the cutter into engagement with the blank so as to cut the flute therein in the manner illustrated diagrammatically in Fig. 14. When the carriage 14 has been shifted outward to its full extent, that is the full length of the drill, the second named shoe or under shoe 75 will operate to shift the roller 72 back into engagement with the cam plate 57 again. By this means, the roller which controls the movement of the cutter is alternately engaged with one cam plate and then with the other cam plate, so that as the drill blank moves forward, the cutters 49 and 49ª will engage with the drill blank and cut the flutes in the drill blank, these flutes gradually decreasing in depth as the drill moves forward until at the point b', the deflected portion 60 of the slot 58 will shift the cutters entirely outward from the face of the drill blank. At this time, the rollers 71, controlling the movements of the cutters 49 and 49ª, will be shifted by the inner shoe 75 into slots 59, and upon a retractive movement of the drill blank A, the cutters will be held out of contact with the drill and at the end of this stroke, the rollers will again be shifted by the outer shoes 75 into the grooves 58 and the cutters will be ready for a new cut.

Like mechanism to that for actuating the cutter 49 is used for actuating the cutter 49ª and the same reference numerals have been used for the mechanism for actuating the cutter 49ª as are used for the actuating mechanism for the cutter 49 except that the exponent a has been applied to these numerals. It will be seen from Fig. 2 that whereas the mechanism for actuating the cutter 49 is disposed at the upper right hand side of the machine, the mechanism for actuating the cutter 49ª is disposed on the left hand side of the machine so that the shafts of these cutters 49 and 49ª extend in opposite directions, and that these cutters are disposed in planes which are angular with relation to each other so that one of the cutters cuts the flute on one side of the drill blank while the other cutter is cutting the flute on the opposite side of the drill blank. These cutters, of course, rotate reversely to each other and, therefore, it is necessary to provide the gear wheels 24, 25 and 26 (shown in Fig. 3) so that the gear wheel 29 shall rotate reversely to the gear wheel 29ª.

In order that the cutters 49 and 49ª shall cut a flute of a uniform width in the drill blank while the drill blank is moving longitudinally relative to the cutters and the cutters are moving away from the axis of the drill, it is necessary that the angle of the cutters 49 and 49ª should change slightly with reference to the longitudinal axis of the drill blank. In every drill cutter known to us, this has been accomplished by vibrating the cutters, and one of the objects of this invention is to do away with this mechanism and provide simpler and more positively acting mechanism to this end which shall, as before stated, slightly change the angle of the cutters relative to the longitudinal axis of the drill. It is to this end that we mount the carrier 35 for the cutter 49 to swing upon the shaft 33 and the carrier 35ª for the cutter 49ª to swing upon the shaft 33ª. The mechanism for swinging one of these carriers 35 or 35ª is identically the same as the mechanism which swings the other carrier. I will now describe the mechanism for swinging the carrier 35ª. The carrier 35ª is connected at one corner with a sliding plate 78ª. This plate 78ª, as illustrated in Figs. 9, 11 and 12, is formed with a rib 79ª on one face and at its opposite face with an outwardly projecting lug 80ª and an outwardly projecting lug 81ª. The lug 80ª is relatively wide and is formed with an elongated, relatively rectangular slot 82ª, while the lug 81ª is relatively shorter and is disposed at the opposite end of the plate 78ª and is perforated. Having sliding movement within the slot 82ª is a small block 83ª, and a pin 84ª passes through a bushing in this block and engages the carrier ⁻ª. This plate 78ª slides in a groove 85ª formed in a support 86ª (see Fig. 11) and is held thereby by a plate 87ª attached to the member 86ª. The lug 81ª carries a pin 88ª having a roller 89ª, and coacting with this roller is a longitudinally extending cam plate 90ª having therein an angular cam slot 91ª (see Fig. 9) in which the roller engages. This cam plate is slidably mounted on a support 92ª which is attached to the wall of the machine, as illustrated in Fig. 10. The cam plate 90ª has a lug at one end engaged by a screw-threaded rod 93ª projecting from the carriage or sliding member 14.

It will be seen from Fig. 9 that when the plate 90ª is shifted to the right in Fig. 9, the roller carried by lug 81ª will be gradually moved downward, as shown in Fig. 9, shifting the sliding plate 78ª downward in groove 85ª of member 86ª, and that thus the carrier 35ª will be rocked on its axis 38ª, thus shifting the cutter 49ª to a greater angular relation to the longitudinal axis of the blank A, and that upon a reverse movement of the slide 90ª, that is a movement to the left in Fig. 9, the cutter 49ª will be turned into a less angular relation. The same movement will be secured for the cutter 49. Thus, for instance, referring to Fig. 5, when the plate 90 is shifted to the right in this figure, the roller carried by the lug 81 will be gradually moved downward, shifting the plate 78 downward, and as a consequence the carrier 35 will be rocked on its axis 38, thus shifting the cutter 49 to a greater angular relation to the longitudinal axis of the blank A, and upon a reverse movement of the slide 90, the cutter 49 will be turned into a less angular relation. As before remarked, the mechanism for securing this compensating movement of the cutters 49 and 49ª is alike for both of these cutters, and I have, therefore, distinguished the compensating mechanism for one cutter over the compensating mechanism for the other cutter by the addition to the reference numerals of the exponent a.

The blank from which the drill is formed must be cut to provide for a clearance of the drill, that is must be slightly recessed between the flutes of the blank. To this end, I provide clearance cutters 94 and 94ª which operate on the drill blank between the flutes. The mechanism for driving both these cutters is the same. Of course, each of these cutters must be shifted away from the longitudinal axis of the drill blank upon the forward movement of the drill blank so as to cut the clearance spaces and must be shifted out away from contact with the drill blank when the drill blank and chuck are moving reversely. The cutter 94 is mounted upon a shaft 95 which extends through a bearing 96 in a block 97 and this shaft carries at its end a pulley 98. The cutter 94ª is mounted upon a shaft 95ª supported in a bearing 96ª on the block 97ª, and the cutter 94 is disposed in diametrically opposite relation to the cutter 94ª, as illustrated particularly in Fig. 2. This shaft 95ª is also provided with a pulley 98ª. Disposed above the machine are a pair of pulleys 99 and 99ª and an endless belt 100 extends over the pulley 99, downward over the pulley 98, then back over the pulley 99ª, then downward over the pulley 98ª, and back over the pulley 99. The pulley 99 is fast on a shaft 101 which is driven in any suitable manner, but the pulley 99ª is loose on this shaft and is simply an idler.

By this means, the two cutter shafts 95 and 95ª are rotated in opposite directions. For the purpose of shifting these clearance cutters 94 and 94ª nearer to or farther from the blank, we provide the block 97 with an outwardly projecting, screw-threaded stud 102 which engages with an angular member 103. Also attached to this face of the angular member 103 is the supporting member 104 which extends in parallel relation to the member 103 and these members 103 and 104 support the spindle or trunnion 105 of the roller 106 which is shiftable in the direction of its trunnions.

Mounted on the adjacent wall 13 is an angular guide plate 107 formed with an undercut flange 108 at its free edge and operating upon this flange and between the plates 103 and 104 are the sliding cams 109 and 110, which are illustrated in superposed relation in Fig. 15. These cam slides are formed with longitudinally extending, registered slots 111, each slot having parallel side walls but being off-set, as at 112, the off-set on one cam slide being disposed in spaced relation to the off-set on the other cam slide. The roller 106 travels along the slot of one plate and is guided thereby to hold the corresponding clearance cutter parallel to the axis of blank, and then when it reaches the end of the slot on that plate and the corresponding cutter has reached the end of its stroke with relation to the blank, the roller shifts into engagement with the other slide by a means which is the equivalent of the construction illustrated for shifting the roller controlling the flute cutters. Thus, extending from the angular plate 103 is a bracket 113 which, at its end, is formed with a head 114 and in this head are disposed the two pins 115 which are the equivalent of pins 74 in Fig. 4. These pins carry the shoe 116 which is the equivalent of the shoe 75 and which is beveled at one end so as to engage with the adjacent trunnion 105. A like shifting device including pins and shoe and spring 117 may be mounted upon the plate 104 or in any other suitable position to engage the trunnion 105 at the opposite end of the stroke. These shoes 116 operate in precisely the same manner as the shoes 75 used for controlling the shifting of the controlling roller for the flute cutters. The slides 109 and 110 are engaged with each other, and one of the slides is provided with an angular terminal end 118 engaged by a screw stud 119 projecting from the member 14. The mechanism for shifting the slides 109 and 110 for the clearance cutter 94 is precisely the same as the mechanism used for shifting the slides 109ª and 110ª for shifting the clearance cutter 94ª, as illustrated most clearly in Fig. 2.

The members 97 and 97ª are each slidingly supported upon a guide block 120 and 120ª respectively, this guide block being mounted upon the frame of the machine and having its face formed with the dove-tailed groove 121, the member 97 or the member 97ª having a dove-tailed rib engaging in this groove. This is shown most clearly in Fig. 3.

The operation of this mechanism will be clear from what has gone before, but summarizing the operation, it may be stated that the carriage or like member 14 is caused to move toward or from the cutters 49 and 49ª, 94 and 94ª, the blank A being disposed centrally with relation to these four cutters, the cutters 49 and 49ª being disposed in diametrical relation to the blank and the cutters 94 and 94ª being disposed in diametrical relation. As the blank A is shifted toward the cutters, it is at the same time rotated by mechanism which is not necessary to illustrate and is of ordinary form and well understood, and at the same time all four cutters are rotated through the driving mechanism described. As the spiral flutes are made in the blank by the advance of the blank, the cutters 49 and 49ª under the action of the cam slides 56 and 57 and 56ª and 57ª gradually move outward, thus rendering the flute shallower toward the butt end of the drill. When the cut has been entirely made, the deflection 60 will cause the cutters 49 and 49ª to move suddenly outward to a point beyond and out of contact with the surface of the blank. The blank then continues to move on to permit the clearance cutters to finish their work, these clearance cutters being disposed slightly behind the flute cutters 49 and 49ª, (see Fig. 5) and acting after the flute cutters have acted. These clearance cutters travel parallel to the surface of the blank for a length equal to that of the flutes and then are shifted outward by the deflections 112 on the cam 109. All of the cutters are now out of contact with the surface of the blank. The carriage 14 is then retracted, retracting the blank with the cutters out of engagement therewith, and when the blank has been fully retracted, the cam plates shift these cutters into position again for a new cut on a new drill blank. As the cutters 49 and 49ª move outward, it is necessary, as before stated, to change the angle of the cutters.

It will be seen that with this machine a drill may be spirally fluted and the clearance of the drill cut at one operation, thus greatly reducing the cost of machining the drill. Furthermore, means of this character is well known on other forms of drill cutting machines. It will be seen that by changing the cams 56 and 57 and the cams which control the clearance cutters, drill blanks of many different sizes may be worked on this machine, as these cams control the movement of the cutters and the swing of the cutters.

While we have illustrated an embodiment of our invention which has been found to be thoroughly successful and effective, yet we do not wish to be limited thereto, as it is obvious that many changes might be made in the details of construction and arrangement of parts without departing from the spirit of the invention.

We claim:—

1. A drill cutting machine including a rotatable and longitudinally movable drill chuck and means for simultaneously cutting a plurality of spiral flutes longitudinally of the drill as the drill chuck moves in one direction and simultaneously cutting the drill longitudinally between said flutes to provide for the clearance of the drill while the drill is moving in one direction, and means then acting to shift the cutting means outward away from the drill blank while the chuck is moving in the opposite direction.

2. A drill cutting machine including a rotatable and longitudinally movable drill chuck, a flute cutter including a rotatable cutting element disposed at an angle to the longitudinal axis of the blank mounted in said chuck, means for shifting said cutter inward into engagement with the cutting edge of the drill blank and gradually shifting said cutter outward as the drill blank moves longitudinally to thereby form a spiral flute in the drill blank, said flute getting shallower toward its inner end, and means for simultaneously shifting the cutter to change the angle of the cutter relative to the longitudinal axis of the drill blank to compensate for the outward movement of the cutter relative to the blank.

3. A drill cutting machine including a rotatable and longitudinally movable drill chuck, a pair of flute cutters disposed on opposite sides of the path of movement of the blank supported in said chuck, means for shifting the cutters into engagement with the cutting end of the drill and gradually shifting said cutters outward away from the drill blank to thereby reduce the depth of the flutes formed by said cutters in the drill blank, said means acting to shift the cutters rapidly outward at the end of their cut, and means acting to hold the cutters away from the drill blank while the drill blank is being carried rearward and then suddenly shift the cutters toward the drill blank when a drill blank is being carried forward.

4. A drill cutting machine including a rotatable and longitudinally movable drill chuck, a pair of flute cutters disposed on opposite sides of the path of movement of the blank supported in the chuck, a pair of clearance cutters disposed on opposite sides of the path of movement of the blank, means for shifting the cutters into engagement with the cutting end of the drill blank as the chuck moves in one direction, means then acting to shift the clearance cutters into engagement with the drill blank, means for shifting the flute cutters gradually outward as the chuck moves forward and then shifting the flute cutters quickly outward, means acting to keep the clearance cutters parallel to axis of drill as blank moves forward and then shifting quickly outward, and means for holding the clearance cutters and the flute cutters away from the blank while the blank is moving backward.

5. A drill cutting machine including a rotatable and longitudinally movable drill chuck, a pair of flute cutters disposed on opposite sides of the path of movement of the blank supported in the chuck, a pair of clearance cutters disposed on opposite sides of the path of movement of the blank, means for shifting the cutters into engagement with the cutting end of the drill blank as the chuck moves in one direction, means then acting to shift the clearance cutters into engagement with the drill blank, means for shifting the flute cutters gradually outward as the chuck moves forward and then shifting the flute cutters quickly outward, means acting to keep the clearance cutters parallel to the axis of the drill as blank moves forward and then shifting quickly outward, and means for holding the clearance cutters and the flute cutters away from the blank while the blank is moving backward, said means including cams movable by and in accordance with the longitudinal movement of the chuck.

6. A drill cutting machine including a rotatable and longitudinally movable drill chuck, a pair of flute cutters disposed on opposite sides of the path of movement of the blank supported in the chuck, a pair of clearance cutters disposed on opposite sides of the path of movement of the blank, means for shifting the cutters into engagement with the cutting end of the drill blank as the chuck moves in one direction, means then acting to shift the clearance cutters into engagement with the drill blank, means for shifting the flute cutters gradually outward as the chuck moves forward and then shifting the flute cutters quickly outward, means acting to keep the clearance cutters parallel to the axis of the drill as the blank moves forward and then shifting quickly outward, and means for holding the clearance cutters and the flute cutters away from the blank while the blank is moving backward, said means including longitudinally movable cam plates having cam slots therein and operatively connected to move in accordance with the movement of the chuck.

7. A drill cutting machine including a rotatable and a longitudinally movable drill chuck adapted to suport a drill blank, flute cutter engageable with the blank as the blank moves forward, a slide upon which the drill cutter is mounted, means for rotating the drill cutter, and means for longitudinally shifting the slide to thereby cause the cutter to move gradually away from the axis of the blank upon the forward movement of the chuck and move quickly away from the axis of the blank when the end of the cut has been reached and hold the cutter outward away from the face of the blank while the blank is being retracted by the chuck, said means including a longitudinally shiftable slide operatively connected to move with the chuck and having a cam slot therein, and a member connected to the slide and engaging in said cam slot.

8. A drill cutting machine including a rotatable and a longitudinally movable drill chuck adapted to support a drill blank, a flute cutter engageable with the blank as the blank moves forward, a slide upon which the drill cutter is mounted, means for rotating the drill cutter, and means for longitudinally shifting the slide to thereby cause the cutter to move gradually away from the axis of the blank upon the forward movement of the chuck and move quickly away from the axis of the blank when the end of the cut has been reached and hold the cutter outward away from the face of the blank while the blank is being retracted by the chuck, said means including two longitudinally movable slides attached to each other for common movement and both operatively connected to move longitudinally with the chuck, each of said slides having a cam slot therein, the cam in one slide controlling the movement of the cutter as the blank is moving outward and the slot in the other slide controlling the cuttter as the blank is moving inward, a roller operatively connected to the first named cutter slide and shiftable into one or the other of said slots, and means for shifting the roller from one slot into the other when the controlling slides have reached predetermined positions.

9. In a cutting machine of the character described, a cutter, a slide supporting the cutter, means for shifting the slide including two longitudinally reciprocating plates attached to each other for common movement, each plate being provided with a cam slot, a roller adapted to engage the cam slots and having trunnions, the roller being shiftable from one cam slot to the other, and means for shifting said roller at the ends of the stroke of said plates comprising shoes mounted upon said plates in spaced relation to each other and on opposite sides of the plates, said shoes moving with the plates and having inclined faces adapted to engage with the trunnions of said roller to alternately shift it from one slot into the other slot.

10. A drill cutting machine including a rotatable and longitudinally movable drill chuck, a flute cutter adapted to engage the blank held in said chuck, a slide for controlling the depth of cut of the cutter and mounted for movement toward or from the axis of the blank, means for rotating the flute cutter as the slide shifts, and means for shifting the slide including members operatively connected to and movable with the slide, longitudinally extending cam plates attached to each other and disposed between said members and formed with registering cam slots, disposed at an inclination to the line of movement of the plates, a roller adapted to operate in one or the other of said cam slots and having trunnions projecting through said members and longitudinally slidably therein, the movement of the roller by the cam slots acting to shift said members and the cutter carrying slide, and means mounted upon and movable with said cam plates for shifting said roller alternately from one cam slot into the other.

11. A drill cutting machine including a rotatable and longitudinally movable drill chuck, a flute cutter adapted to engage the blank mounted in said chuck, a slide operatively supporting the cutter, a hinged member upon which the slide is mounted, the slide being shiftable in a direction to carry the cutter toward or from the axis of the drill blank, means for shifting the slide in accordance with the movement of the chuck, and means controlled by the movement of the chuck for swinging said member upon which the slide is mounted to thereby gradually change the angle of the cutter as the slide is shifted.

12. A drill cutting machine including a rotatable and longitudinally movable drill chuck, a pair of flute cutters disposed on opposite sides of the path of movement of the blank supported in the chuck, and means movable longitudinally with the drill chuck acting to shift the cutters gradually outward as the drill chuck moves forward to thereby cause the flutes formed by said cutters to become gradually shallower, said means then acting to shift the cutters quickly outward to clear the cutters from the blank, said means acting upon a reverse movement of the chuck to hold the cutters away from the face of the blank until the chuck has moved entirely rearward and then shift the cutters inward into cutting position again, means causing the cutters to be shifted to a less acute angle with the longitudinal axis of the drill blank as the cut made by the cutters grows shallower, a pair of clearance cutters acting between the flute cutters, and means connected to and moving with the chuck causing said clearance cutters to shift into engagement with the blank supported in the chuck at the beginning of the cut, and keep the cutters parallel to the longitudinal axis of the work as the blank and chuck move forward, then shift quickly outward when the cut has been made, and then be held in its outward shifted position while the blank is being retracted.

13. A drill cutting machine including a rotatable and longitudinally movable drill chuck, a pair of flute cutters disposed on opposite sides of the path of movement of the blank supported in the chuck, and means movable longitudinally with the drill chuck acting to shift the cutters gradually outward as the drill chuck moves forward to thereby cause the flutes formed by said cutters to become gradually shallower, said means then acting to shift the cutters quickly outward to clear the cutters from the blank, said means acting upon a reverse movement of the chuck to hold the cutters away from the face of the blank until the chuck has moved entirely rearward and then shift the cutters inward into cutting position again, means causing the cutters to be shifted to a less acute angle with the longitudinal axis of the drill blank as the cut made by the cutters grows shallower, a pair of clearance cutters acting between the flute cutters, and means connected to and moving with the chuck causing said clearance cutters to shift into engagement with the blank supported in the chuck at the beginning of the cut, and keep the cutters parallel to the longitudinal axis of the work as the blank and chuck move forward, then shift quickly outward when the cut has been made, and then be held in its outward shifted position while the blank is being retracted, the means for shifting the flute cutters toward and from the axis of the blank comprising longitudinally movable cam plates having cam slots therein, a roller engageable in one or the other of the cam slots of each pair of plates and each roller being operatively connected to its respective cutter, means operatively connecting the cam plates to the chuck to cause a longitudinal movement of the cam plates with the chuck, and means for shifting the roller from the cam slot of one plate into the cam slot of the other when the chuck has reached the end of its stroke, the means for changing the angle of the flute cutters including a cam plate operatively connected to move with the chuck and having a cam slot, a roller therein operatively connected to the cutter to swing the cutter to a different angle as the cam slot moves with relation to the roller, the means for shifting the clearance cutters including a pair of cam plates for each clearance cutter operatively connected to the chuck and movable therewith, a roller for each pair of cam plates operatively connected to the corresponding clearance cutter, and means for shifting each roller alternately from one to the other cam plate as the pair of cam plates reach the end of their strokes.

14. A drill cutting machine including a rotatable and longitudinally movable blank carrying chuck, a pivoted supporting member, a slide mounted upon said supporting member, a drill cutter mounted upon said slide and adapted to engage the blank supported in the chuck, the center of rotation of said pivoted member being on a diametrical line intersecting the center of the cutter whereby a rotation of said supporting member upon its pivot will change the angle of the cutter relative to the work, driving means for the cutter, means operatively connected to the drill chuck to shift the sliding member upon the supporting member to thereby shift the cutter toward or from the longitudinal axis of the drill blank, and means operatively connected to the chuck and movable therewith for swinging said supporting member upon its pivotal axis to thereby change the angle of the cutter.

15. A drill cutting machine including a rotatable and longitudinally movable drill blank chuck, a flute cutter disposed on one side of the line of motion of the drill blank, a swinging supporting member, a slide mounted thereon and operatively supporting the drill cutter, means for rotating the drill cutter, means connected to the chuck and movable therewith for shifting the slide to carry the drill cutter from the longitudinal axis of the blank as the chuck moves forward to thereby gradually decrease the depth of the flute in the blank made by the cutter and withdraw the cutter from engagement with the blank when the cut is made and the chuck moves rearward, means operatively connected to and movable with the chuck for swinging said supporting member to thereby change the angle of the cutter relative to the longitudinal axis of the drill blank, a clearance cutter normally disposed in the path of movement of the blank, means for keeping said clearance cutter parallel to the longitudinal axis of the blank as the blank and chuck move forward, said means then acting to withdraw the clearance cutter from engagement with the blank and hold it out of engagement while the blank and chuck are moving rearward.

16. A drill cutting machine including a rotatable and longitudinally movable drill blank chuck, a pair of flute cutters disposed on opposite sides of the path of movement of the drill blank, means for rotating said cutters in opposite directions, means for shifting the cutters into engagement with the cutting end of the drill, then shifting the cutters outward away from the longitudinal axis of the drill to reduce the depth of the flute cut by the cutters and then shift the cutters entirely out of engagement with the drill blank while the chuck and drill blank are moving rearward, a pair of clearance cutters disposed on opposite sides of the drill blank, means for rotating said clearance cutters in opposite directions, and means moving with the chuck causing the clearance cutters to keep in a line parallel to the longitudinal axis of the blank as the blank moves forward, said means then shifting the clearance cutters entirely out of engagement with the blank and holding them from such engagement while the blank is moving rearward.

In testimony whereof we hereunto affix our signatures.

STANLEY F. GIERYMSKI.
PETER PIETRZYCKI.